Aug. 4, 1970
F. D. PRICE
3,522,498
COMBINATION CAPACITOR HAVING A MARGINLESS METALLIZED
DIELECTRIC STRIP AND A FOIL ELECTRODE
Filed Oct. 14, 1968
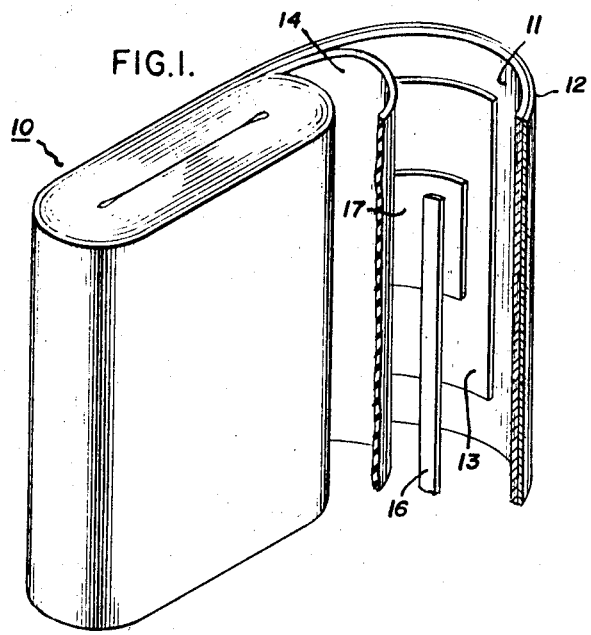
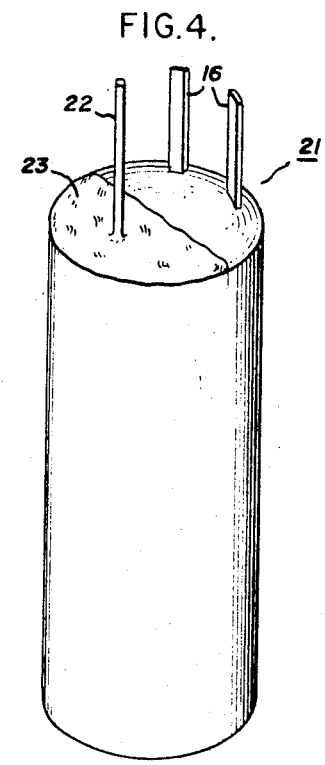
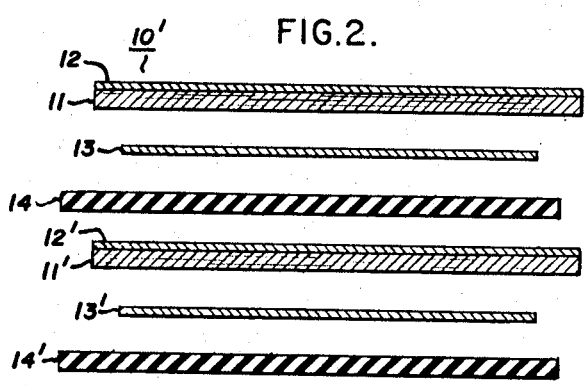
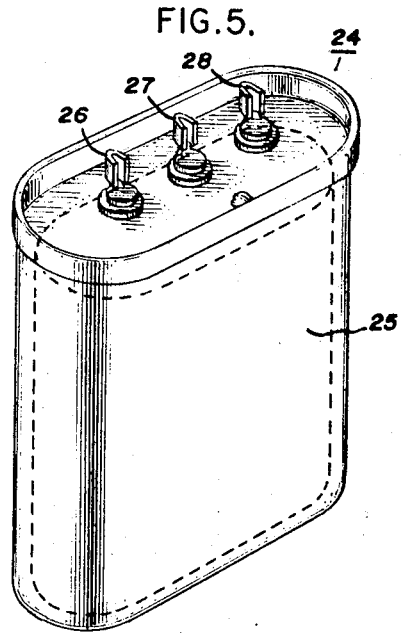
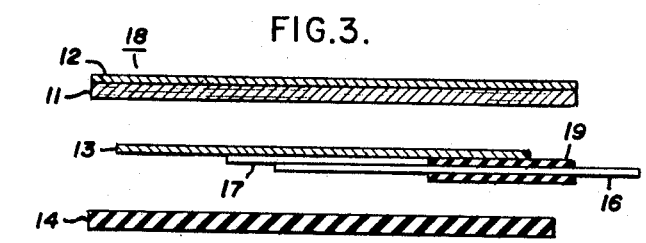
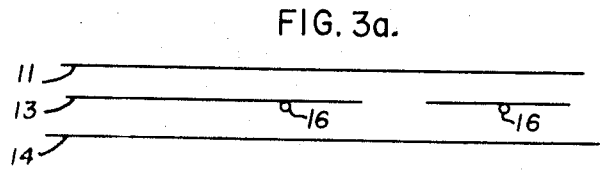
INVENTOR:
FRANK D. PRICE,
BY *James J. Lichiello*
HIS ATTORNEY.

United States Patent Office 3,522,498
Patented Aug. 4, 1970

3,522,498
COMBINATION CAPACITOR HAVING A MARGIN-LESS METALLIZED DIELECTRIC STRIP AND A FOIL ELECTRODE
Frank D. Price, South Glens Falls, N.Y., assignor to General Electric Company, a corporation of New York
Filed Oct. 14, 1968, Ser. No. 767,283
Int. Cl. H01g 1/13
U.S. Cl. 317—258                     6 Claims

ABSTRACT OF THE DISCLOSURE

A combination capacitor roll section includes one electrode of a self-supporting nature such as an aluminum foil, and an opposite electrode of a metallized coating on a dielectric strip. A further dielectric strip is positioned between the electrodes. Because of the structure of the combination capacitor involving a dielectric strip between a metallized electrode and a self-supporting electrode, the metallized electrode need not include a non-metallized edge margin.

BACKGROUND OF THE INVENTION

Field of the invention

This invention relates to combination capacitors, and more particularly to a combination capacitor having one electrode as a foil electrode and the other electrode as a metallized strip where the metallizing is coextensive with the strip width.

Description of the prior art

A metallized electrode for a roll capacitor may be described as a thin layer of electrode metal such as aluminum which has been suitably coated on a dielectric strip of, for example, a paper or resin material. Metallized electrodes are desirable for use in various capacitors and particularly in ballast capacitors, particularly because of their known electrical self-heating properties, and because they reduce the overall volume of the capacitor. Furthermore, metallizing may be produced by various processes including metal evaporation which can be controlled to provide predetermined permeability characteristics with respect to a dielectric liquid impregnant. In a tightly wound roll capacitor element, it is difficult to provide full, complete, or essentially complete impregnation at the interior or central portions of the roll when ordinarily non-porous resins are used as the sole dielectric medium, and where a resin film utilized in the dielectric medium also includes a metallized coating thereon as an electrode.

A salient disadvantage in the use of metallized electrodes relates to the practice of using uncoated or unmetallized margins on metallized electrodes to avoid short-circuiting at the edges of the roll. These uncoated margins add considerably to the cost of the capacitor, particularly in the added operations such as masking, while at the same time not providing any additional capacitor benefits.

Further disadvantages in the use of metallized electrodes are the problems of providing for all leads to extend from one end of the capacitor, and with respect to multi-section capacitors, the problem of longitudinally separating a strip of a metallized material or the metallizing to serve as a pair of electrodes with a common electrode. In the separation of a metallized strip, the dielectric strip is also separated so that further insulation is necessary at this point, or further processing must be employed to remove some of the metallized layer.

SUMMARY OF THE INVENTION

Accordingly, it is an object of this invention to provide an improved metallized electrode capacitor.
It is a further object of this invention to provide an improved metallized electrode combination capacitor.
It is yet another object of this invention to provide an improved combination capacitor embodying a separate foil electrode, a separate dielectric and a separate metallized marginless electrode.
These and other objects of this invention will be better understood when taken in connection with the following description of the drawings.

BRIEF DESCRIPTION OF THE DRAWINGS

FIG. 1 is an illustration of one preferred embodiment of this invention as a combination capacitor.
FIG. 2 is a partial, cross sectional view of a section of FIG. 1 where the individual self-supporting strips are illustrated in a spaced array for the purposes of clarity.
FIG. 3 illustrates an insulated form of the tap strap assembly of FIG. 1.
FIG. 3a is a schematic illustration of a multi-section capacitor in accordance with FIG. 3, and viewed along the longitudinal axis of the strips which make up a roll capacitor.
FIG. 4 illustrates a multisection roll capacitor with all leads extending from one end. FIG. 5 illustrates the capacitor of FIG. 4 as an impregnated cam type capacitor.
Briefly described in one preferred embodiment of this invention, a combination capacitor includes a dielectric strip having a metallized aluminum layer thereon which is coextensive with the width of the strip. In conjunction with the metallized strip there is provided a self-supporting metal foil strip, of lesser width than the dielectric strip, which is spaced from the metallized strip, by a further dielectric strip wider than the foil strip. The described layer arrangement is rolled in convolute form and may be utilized as a dry capacitor, or as an impregnated capacitor in a suitable housing.

DESCRIPTION OF THE PREFERRED EMBODIMENT

Referring now to FIG. 1, one exemplary embodiment of this invention is illustrated as a capacitor roll section 10 which is sometimes referred to as a combination or mixed electrode capacitor. A more complete description of this type of capacitor is given in copending application Ser. No. 767,275, filed concurrently herewith, and assigned to the same assignee as the present invention.
A combination or mixed electrode capacitor includes one electrode of a discrete self-supporting electrode structure such as an aluminum metal foil, and a further different electrode which is usually prepared by metal coating or metallizing a suitable dielectric material. A separate dielectric strip is employed therebetween. A combination capacitor may also have mixed dielectric strips, one of which may be of a synthetic resin material and metallized, and the other of which may be of a paper-like material. In dry capacitors the dielectric materials are usually the same. In impregnated capacitors more highly absorptive or porous materials may be used for the other dielectric material.
One preferred arrangement of a combination capacitor is illustrated in FIG. 1 as roll section 10. Section 10 includes a first dielectric strip 11 of any well known capacitor strip dielectric material including paper and such synthetic resins as polyethylene terephthalate, polysulfone, and preferably the polyolefins, particularly polypropylene. Strip 11 is covered or coated on one surface with a layer 12 of a suitable electrode metal such as copper, zinc or aluminum. Metal layer 12 is preferably a metallized aluminum layer which is integrally attached to the dielectric strip 11 for supporting purposes and may be provided by well known metal evaporation processes.

In this invention the metallized layer 12 extends to the maximum width of strip 11 or is otherwise descrbed as coextensive with the width of strip 11 so that strip 11 is for all practical purposes, a marginless strip.

Next adjacent the non-metallized side of dielectric strip 11 there is positioned a free or self-supporting aluminum foil strip 13 as the opposite electrode to aluminum layer 12. Aluminum foil strip 13, because it is an integral foil strip is expeditiously made narrower than strip 11 to be overlapped thereby along both its longitudinal edges.

Next adjacent the aluminum foil strip 13 there is positioned a dielectric strip 14 which may be of a resin material or, for an impregnated capacitor, may be a porous material such as kraft paper, or any other similar material which has enhanced absorptive properties with respect to the more common dielectric liquid impregnants such as mineral oil, castor oil, silicone oil, cottonseed oil and the chlorinated hydrocarbons, for example as trichlorodiphenyl. In this invention as a practical expedient the width of the dielectric strip 14 is at least equal to that of strip 11.

In assembling roll section 10, one or more dielectric strips 14 may be utilized as well as one or more resin strips 11 may be utilized with only the outermost strip having a metal layer 12 thereon. In winding the section 10 with the dielectric strip 14 being the center of revolution, a cross section of the roll takes the appearance of that in FIG. 2 where, for the purposes of clarity, the self-supporting strips are illustrated in spaced array. Referring to FIG. 2, it is specifically noted that, between a pair of electrodes such as metallized electrode 12 and a foil electrode 13, there is positioned only one of the dielectric strips 11 or 14, and the other dielectric strip appears between electrode 13' and the next turn of opposite electrode 12, appearing as 12'. However, if dielectric strip 14 is a different material such as paper, then foil electrode 13 within the roll has on one side of it a more readily impregnable paper strip 14, while on the other side of it the difficult to impregnate resin strip 11. However, the dielectric strip 11 is coated with a metallized layer which is predeterminedly impregnable by a dielectric liquid impregnant, or may be provided with suitable pore openings or other fluid passing means. In FIG. 2, as a practical expedient, the dielectric paper strip 14 is illustrated in offset relationship to metallized strip 12. This arrangement provides an exposed metallized edge at one end of the roll for favorable schooping or metal coating purposes, and a paper extension at the other end of the roll for metal can insulation purposes where the roll section is assembled in a metal can for impregnation.

A self-supporting or foil electrode is desirable in a combination design capacitor because it is more economical than metallized strips, has high heat conductivity, expeditiously provides for a tab lead, and is easily separated for multi-section use. One example of a multi-section capacitor is illustrated in U.S. Pat. 3,365,632—Grahame, assigned to the same assignee as the present invention.

It is the important feature of this invention that the metallized layer 12 on the dielectric strip 11 may extend coextensively for the entire width of strip 11 and need not show uncoated margins on strip 11. In the manufacture of metallized film electrodes, it is the usual practice to provide the uncoated edge or margins on the dielectric which is to be metallized, as noted for example in U.S. Pat. 3,292,061—Eustance, assigned to the same assignee as the present invention. Such margins are necessary in order to prevent short-circuiting between the metallized layers at the roll edges. For example, a pair of dielectric strips, each with one surface metallized, and wound in a capacitor roll section places the metallized surfaces at the roll edges in critical electrical shorting relationship. However, by the use of an intermediate dielectric strip, as illustrated in FIG. 2, the shorting problem is alleviated and a marginless metallized electrode may be employed. It is a specific advantage of the present invention that the uneconomic feature of margins is eliminated because adjacent electrodes in a capacitor roll are either separated by a paper strip or a resin strip from an adjacent electrode, and the width of the foil electrode may more conveniently and expeditiously be made less than that of the metallized layer. This elimination provides an important advantage of increasing the capacitor of the roll section because of larger electrode area, and also providing an even greater reduction in capacitor volume than with metallized margin electrodes.

As illustrated in FIG. 2, metallized layer 12 is insulated from electrode 13 by the use of the intermediate dielectric strip 14. Metallized layer 12 in combination with its strip 11 extends beyond strip 14 at the righthand portion of the roll so that the metallized layer 12 is exposed at that roll edge and may be conveniently schooped or coated with a metal for electrode attachment thereto. Metallized layer 12 is insulated from foil 13 by dielectric strip 11 on one side and by dielectric strip 14 on the other side. The offset relationship of dielectric strip 14 between layer 12' and electrode 13' and the fact that foil 13 is narrower than strip 14 effectively insulates layer 12 from electrode 13. If per chance the electrode 13 was a metallized coating on the surface of dielectric strip 14, an uncoated margin would be necessary on strip 14. Electrode 13 being narrower than strip 14 essentially removes the possibility that the schooping or spraying process would provide a metal contact with foil 13.

It is quite desirable in metallized capacitors to have the leads project from one end, and this is particularly true in a case of ballast capacitors. However, because of margins and the concurrent expediency of opposite margins in the roll edges, metallized capacitors usually include a lead projecting from each end. In the usual practice a suitable metal is sprayed or coated over each end of the capacitor roll section where a metallized edge is exposed, and a lead is joined to this sprayed metal. Such a process is illustrated and described for example in U.S. Pat. 3,256,472—Centurioni, assigned to the same assignee as the present invention. As indicated however in ballast capacitors and particularly multisection capacitors such as for example as shown in U.S. Pat. 3,365,632—Grahame, it is desirable to have all leads project from one end.

In the present invention the metal spraying or schooping process may be eliminated for all leads except the common lead of the capacitor since non-common leads project from the foil electrode 13 and may be assembled as a usual tap strap lead. For example, as illustrated in FIG. 1, a suitable tap strap or wire lead 16 is affixed to a small square of aluminum foil 17 usually referred to as a flag. During the winding of the roll, the flag tap (16 and 17) is inserted in the roll in a desired position and serves as the electrode lead for the electrode foil 13. The lead for the aluminum layer 12 may be formed, in the usual manner as referred to in the Centurioni patent or by other suitable lead joining processes as applicable to metallized films, on the opposite or the same end of the capacitor from which lead 16 extends.

The particular structure and arrangement for three leads for example to extend from the same end of a multi-section capacitor is more clearly illustrated in FIGS. 3 and 4. Referring now to FIG. 3 a capacitor section 18 is illustrated with the various self-supporting strips shown in spaced array for the purpose of clarity. Dielectric strip 14 and foil electrode 13 are positioned in offset relationship with respect to a resin strip 11 and the aluminum layer 12 thereon. Next adjacent the electrode foil 13 there is positioned the tap strip 16, as illustrated in FIG. 1. Tap strap 16 may be connected directly to the aluminum foil 13 by welding, stapling, etc., or may be utilized in conjunction with a flag member 17 for frictional retention in the roll. A separate short section 15 of electrode 13 also includes a tap strap 16 so that a pair of capacitor sections are defined as referred to in the above noted Grahame patent. In order to provide for the proper electrical connections to the aluminum layer 12 as well as to the electrode 13 when the section 18 is wound in roll form, insulation 19 may be provided on a section of tap strap 16 to insulate strap 16 from the overhanging aluminum layer 12. However, tap strap 16 may not be permanently shorted by contact with aluminum layer 12 due to the burn away (self-healing) features of the metallized layer, so that insulating layer 19 may be optional.

When section 18 of FIG. 3 is wound in a roll form, the lead connections thereto are illustrated more clearly in the roll section of FIG. 4. In FIG. 4 roll section 20 is illustrative of the roll form of section 18 of FIG. 3. At one end 21 of the roll section 20 of FIG. 4, a lead 22 is applied to the aluminum layer 12 by the aforementioned metal spraying or schooping process. A schooped metal layer 23 is provided over a half section of the roll and the lead 22 joined thereto by welding, soldering or other suitable joining methods. As illustrated in FIG. 2 for example the metallized layer 12 extends a short distance beyond paper strip 13 at one end of the roll so that it is exposed at the roll edge for schooping purposes. The dielectric strip 14 extends beyond the roll edge (determined by strip 11) at the other end of the roll section a larger distance for tap insulation purposes when a tap is used at that end. By having a portion of the end 21 unsprayed with any molten metal such as metal 23, one or more tap straps 16 may be brought out of the roll as described in FIG. 3.

This invention thus comprises, in one form, a first dielectric material strip, for example a resin strip 11, which is spaced from a second dielectric material strip, for example a further resin strip 14. Polypropylene and polysulfone are exemplary resins for each of strips 11 and 14. Between these dielectric strips there is a foil strip such as strip 13 which is adjacent the second dielectric strip 14 and completes the composite.

Referring again to FIG. 2 the foil strip 13 may be replaced with a dielectric strip, porous or non-porous or paper or resin, which has been metallized on both sides (doubly metallized), a structure which is self-supporting. Preferably the doubly metallized dielectric material is paper. Dielectric strip 14 may be a composite one or a sandwich type structure, for example a pair of paper strips and an intermediate resin strip, and the resin strip 11 may also be a composite, for example a pair of resin strips and an intermediate paper strip.

This invention as illustrated in FIG. 1 may include a number of other modifications in arrangement. For example the foil electrode 13 need not be between the paper strip 14 and resin strip 13, but may be on the inside of the roll so that reading outwardly there is foil-paper-metal layer as compared to FIG. 1 which reads outwardly paper 14, foil 13, and resin 11. In either instance the roll may be wound with the foil strip 13 as the inside or outside strip of the roll, or with the paper strip 14 as the inside or outside strip of the roll.

Additionally, and where applicable the foil strip 13 may be dispensed with in favor of a metallized layer on the adjacent paper strip. Electrodes 12 and 13 may be replaced by other electrode structures. As one example foil electrode 13 may be replaced by a metallized strip metallized on one or both faces, i.e., a doubly metallized strip, and the strip may be porous or non-porous. By the same token the layer 12 may comprise a separate metal strip.

In all embodiments of this invention one or more of the strips 11, 12, 13 and 14 may be replaced by integral sandwich type structures, as illustrated for example in U.S. Pat. 3,363,156—Cox, assigned to the same assignee as the present invention.

This invention is preferably utilized as a dry or unimpregnated capacitor, but may be an impregnated capacitor utilizing such dielectric liquid impregnants as mineral oil, cottonseed oil, castor oil, silicone oil, and the halogenated hydrocarbons, specifically trichlorodiphenyl.

The embodiment of FIG. 4 for example may be advantageously employed as an impregnated capacitor when a suitable casing or housing is provided as illustrated in FIG. 5.

In FIG. 5 capacitor 24 includes a can member 25 which houses a capacitor roll section such as the section 10 and 20 of FIGS. 1 and 4. In the assembly of this capacitor 24, a roll section such as roll section 10 of FIG. 1 is first flattened into an oval configuration. Thereafter the schooping layer 23 and lead 22 are applied and the section is fitted into can 25. Both lead 16 and lead 22 are connected internally to terminals 26, 27 and 28 on can 25. The can 25 contains the dielectric liquid and is a sealed assembly for this purpose.

While the present invention has been described with reference to particular embodiments thereof, it will be understood that numerous modifications may be made by those skilled in the art without actually departing from the scope of the invention as disclosed. Therefore, the appended claims are intended to cover all such equipment variations as come within the true spirit and scope of the foregoing disclosure.

I claim:
1. A combination roll capacitor comprising
 (a) a foil strip electrode of predetermined width
 (b) a wider overlapping dielectric strip adjacent thereto
 (c) and an electrode formed of a metallized dielectric strip wider than said foil electrode strip with its metallized surface adjacent said dielectric strip
 (d) said metallized strip electrode being of a predetermined width and having a metallized surface attached thereto and coextensive therewith and exposed at one end of said roll
 (e) a metal layer on one end of said roll for lead attachment to said strip
 (f) and a tap strap contacting said foil strip and extending from one end of said roll.
2. The invention as recited in claim 1 wherein said self-supporting electrode is separated along the longitudinal axis of said roll to provide a multi-section capacitor.
3. The invention as recited in claim 1 wherein said roll is impregnated with a dielectric liquid.
4. The invention as recited in claim 3 wherein said metallized strip is paper and said dielectric strip is polypropylene resin.
5. The invention as recited in claim 4 wherein said metallized strip is a synthetic resin.
6. The invention as recited in claim 2 wherein said metallized layer covers a part only of said one roll end, and tap straps adjacent said foil strips project from said one end of said roll through an uncovered part thereof.

References Cited

UNITED STATES PATENTS

| | | | |
|---|---|---|---|
| 965,992 | 8/1910 | Dean | 317—260 |
| 3,248,620 | 4/1966 | Haft | 317—260 X |
| 3,253,199 | 5/1966 | Cozens | 317—260 |
| 3,275,914 | 9/1966 | Hoffman | 317—258 |
| 3,346,789 | 10/1967 | Robinson | 317—260 X |

FOREIGN PATENTS 723,693    2/1955    Great Britain.

ELLIOT A. GOLDBERG, Primary Examiner

U.S. Cl. X.R.

317—260